United States Patent
Ju et al.

(10) Patent No.: US 11,538,288 B2
(45) Date of Patent: Dec. 27, 2022

(54) DIAGNOSTIC SYSTEMS AND METHODS USING AUTOMOTIVE AUDIO BUS

(71) Applicant: GM GLOBAL TECHNOLOGY OPERATIONS LLC, Detroit, MI (US)

(72) Inventors: Jennifer H. Ju, Berkley, MI (US); Andrea R. Marsack, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 38 days.

(21) Appl. No.: 17/240,535

(22) Filed: Apr. 26, 2021

(65) Prior Publication Data
US 2022/0343696 A1   Oct. 27, 2022

(51) Int. Cl.
| | | |
|---|---|---|
| B60W 50/029 | (2012.01) | |
| G07C 5/00 | (2006.01) | |
| H04L 69/00 | (2022.01) | |
| G07C 5/08 | (2006.01) | |

(52) U.S. Cl.
CPC ............ *G07C 5/008* (2013.01); *G07C 5/0808* (2013.01); *H04L 69/26* (2013.01); *G07C 2205/02* (2013.01)

(58) Field of Classification Search
CPC .. G07C 5/008; G07C 5/0808; G07C 2205/02; H04L 69/26
See application file for complete search history.

(56) References Cited

U.S. PATENT DOCUMENTS

| | | | | |
|---|---|---|---|---|
| 2019/0232840 | A1* | 8/2019 | Close | B60N 2/885 |
| 2020/0180653 | A1* | 6/2020 | Chi | B60W 10/04 |
| 2021/0122213 | A1* | 4/2021 | Fridman | F24F 13/24 |

OTHER PUBLICATIONS

"AD2420(W)/6(W)/7(W)/8(W)/9(W) Automotive Audio Bus A2B Transceiver Technical Reference" Analog Devices, Revision 1.1, Oct. 2019; <https://www.analog.com/media/en/technical-documentation/user-guides/AD242x_TRM_Rev1.1.pdf>.

* cited by examiner

*Primary Examiner* — Hongmin Fan

(57) ABSTRACT

A diagnostic system of a vehicle includes: a diagnostic port configured to: connect to a diagnostic device; and receive a request for data from the vehicle from the diagnostic device; a private module connected to a controller area network (CAN) bus of the vehicle and to the diagnostic port; a public communication module configured to wirelessly connect to computing devices within a passenger cabin of the vehicle, where the public communication module is partitioned from the CAN bus of the vehicle; a second module connected to the private module; and an automotive audio bus (A2B) connecting the second module with the public communication module, where the second module is configured to selectively read data from the public communication module via the A2B in response to the request.

20 Claims, 4 Drawing Sheets

DIAGNOSTIC SYSTEMS AND METHODS USING AUTOMOTIVE AUDIO BUS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle diagnostic systems and methods and more particularly to systems and methods for reporting diagnostic data over an automotive audio bus.

Vehicles include one or more torque producing devices, such as an internal combustion engine and/or an electric motor. A passenger of a vehicle rides within a passenger cabin (or passenger compartment) of the vehicle.

Autonomous driving systems drive a vehicle completely independent of a human driver. For example, autonomous driving systems control the acceleration, brake, and steering systems of a vehicle independent of a driver.

Semiautonomous driving systems drive a vehicle partially independent of a human driver. For example, a semiautonomous driving system may control the steering system independent of a driver while relying on the driver to set a target speed for the semiautonomous driving system to achieve by controlling the acceleration and brake systems.

SUMMARY

In a feature, a diagnostic system of a vehicle includes: a diagnostic port configured to: connect to a diagnostic device; and receive a request for data from the vehicle from the diagnostic device; a private module connected to a controller area network (CAN) bus of the vehicle and to the diagnostic port; a public communication module configured to wirelessly connect to computing devices within a passenger cabin of the vehicle, where the public communication module is partitioned from the CAN bus of the vehicle; a second module connected to the private module; and an automotive audio bus (A2B) connecting the second module with the public communication module, where the second module is configured to selectively read data from the public communication module via the A2B in response to the request.

In further features, the public communication module does not transmit any messages to the second module over the A2B.

In further features, the private module is further configured to transmit the read data to the diagnostic device.

In further features, the private module is further configured to convert the read data into a unified diagnostic services (UDS) format and transmit the read data in the UDS format to the diagnostic device.

In further features, the second module is connected to the private module via an Ethernet connection.

In further features: the second module is configured to transmit an interrupt to the public communication module in response to the request; the public communication module is configured to populate a mailbox with the data in response to the interrupt; and the second module is configured to read the data from the mailbox.

In further features: the public communication module is configured to set a mailbox status indicator to a first state when the mailbox has been populated; and the second module is configured to read the data in response to the setting of the mailbox status indicator to the first state.

In further features, the public communication module is configured to set the mailbox status indicator to a second state after all of the data has been read from the mailbox.

In further features: the private module is configured to forward the request to the second module; and the second module is configured to transmit the interrupt in response to receipt of the forwarded request.

In further features: the second module is configured to forward the read the data to the private module; and the private module is configured to transmit the read data to the diagnostic device.

In further features, the private module is further configured to receive data from a third module via the CAN bus and to transmit the received data to the diagnostic device.

In further features, the second module only receives the data requested by the diagnostic device from the public communication module via the A2B.

In a feature, a diagnostic method for a vehicle includes: connecting to a diagnostic device via a diagnostic port; receiving a request for data from the vehicle from the diagnostic device; by a private module, communicating with a controller area network (CAN) bus of the vehicle and the diagnostic port; by a public communication module, wirelessly connecting to computing devices within a passenger cabin of the vehicle, where the public communication module is partitioned from the CAN bus of the vehicle; by a second module, communicating with the private module; and by the second module, communicating with the public communication module via an automotive audio bus (A2B) including selectively read data from the public communication module, by the second module, via the A2B in response to the request.

In further features, the public communication module does not transmit any messages to the second module over the A2B.

In further features, the diagnostic method further includes, by the private module, transmit the read data to the diagnostic device.

In further features, the diagnostic method further includes: converting the read data into a unified diagnostic services (UDS) format; and transmitting the read data in the UDS format to the diagnostic device.

In further features, the diagnostic method further includes, by the second module, communicating with the private module via an Ethernet connection.

In further features, the diagnostic method further includes: by the second module, transmitting an interrupt to the public communication module in response to the request; by the public communication module, populating a mailbox with the data in response to the interrupt; and by the second module, reading the data from the mailbox.

In further features, the diagnostic method further includes: by the public communication module, setting a mailbox status indicator to a first state when the mailbox has been populated; and by the second module, reading the data in response to the setting of the mailbox status indicator to the first state.

In further features, the diagnostic method further includes, by the public communication module, setting the mailbox status indicator to a second state after all of the data has been read from the mailbox.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Some vehicles, such as autonomous vehicles, may include a communication module that allows vehicle passengers to connect to the Internet (e.g., via a Wifi connection) via the communication module of the vehicle. The communication module may not be connected to a vehicle bus (e.g., a controller area network (CAN) bus) of the vehicle, for example, for cybersecurity. More particularly, the communication module may be partitioned from the vehicle bus for increased security. This limits the ability to collect diagnostic data and other data from the communication module.

The present application involves using an atypical communication protocol (e.g. automotive audio bus (A2B)) to obtain diagnostic data and other data from the communication module. Use of A2B communication via an A2B bus may increase cyber security and allow for the collection of diagnostic and other data from the communication module and other public modules of the vehicle that are partitioned from the vehicle bus.

Figure 1:
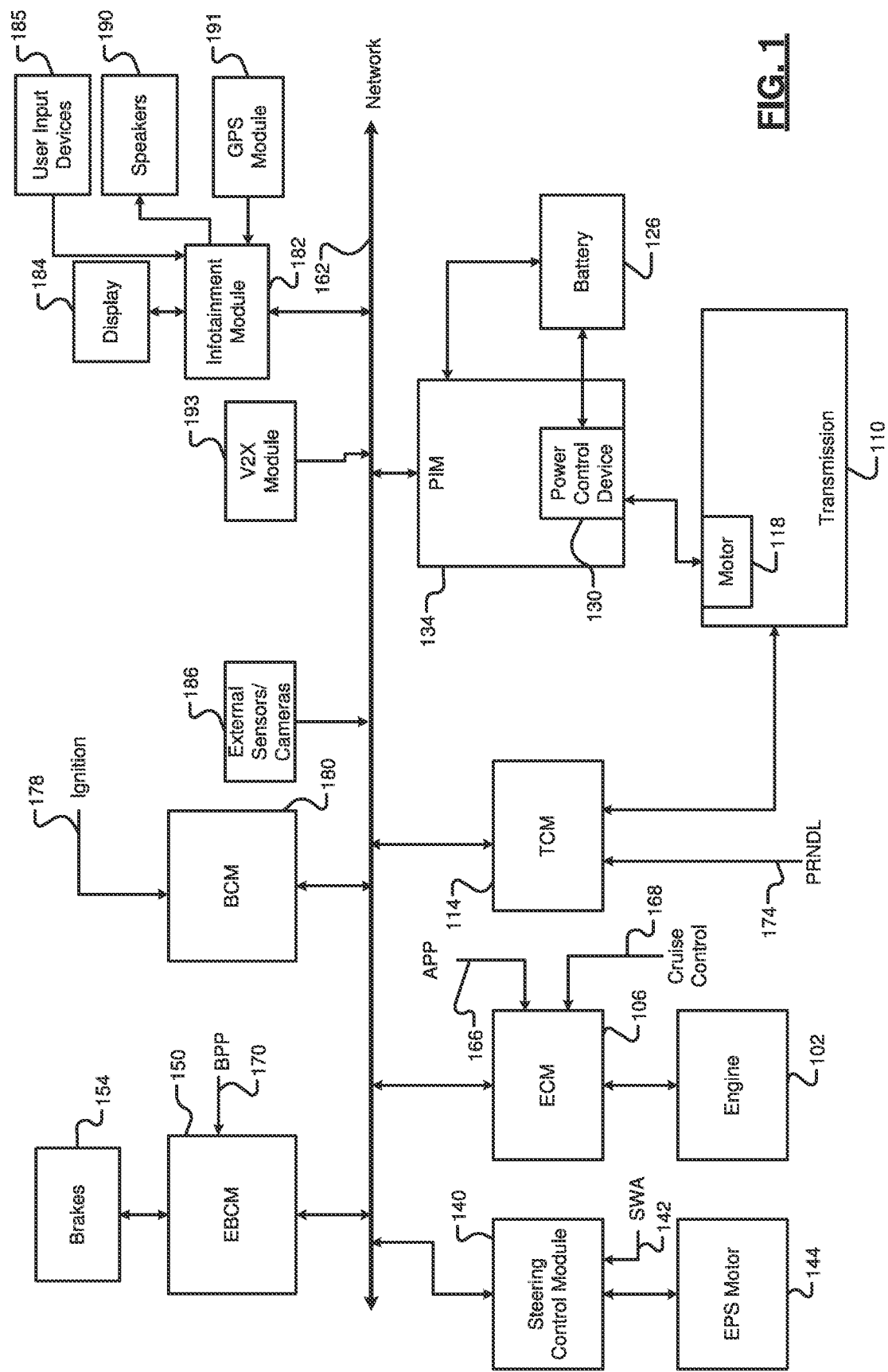
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to non-hybrid vehicles, electric vehicles, fuel cell vehicles, and other types of vehicles. The present application is applicable to autonomous vehicles, non-autonomous vehicles, semi-autonomous vehicles, and other types of vehicles.

An engine 102 may combust an air/fuel mixture to generate drive torque. An engine control module (ECM) 106 controls the engine 102 based on one or more driver inputs. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In electric vehicles, the engine 102 may be omitted.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter module (PIM) 134 may control the electric motor 118 and the PCD 130 based on one or more driver inputs. The PCD 130 applies (e.g., direct current) power from the battery 126 to the (e.g., alternating current) electric motor 118 based on signals from the PIM 134, and the PCD 130 provides power output by the electric motor 118, for example, to the battery 126. The PIM 134 may be referred to as an inverter module in various implementations.

A steering control module 140 controls steering/turning of wheels of the vehicle, for example, based on driver turning of a steering wheel within the vehicle and/or steering commands from one or more vehicle control modules. A steering wheel angle sensor (SWA) monitors rotational position of the steering wheel and generates a SWA 142 based on the position of the steering wheel. As an example, the steering control module 140 may control vehicle steering via an EPS motor 144 based on the SWA 142. However, the vehicle may include another type of steering system. An electronic brake control module (EBCM) 150 may selectively control (friction) brakes 154 of the vehicle, for example, based on one or more driver inputs.

Some modules of the vehicle may share parameters via a controller area network (CAN) 162. The CAN 162 may also be referred to as a car area network. For example, the CAN 162 may include one or more data buses. Various parameters may be made available by control modules to other control modules via the CAN 162. As discussed further below, one or more other modules may be partitioned from and not connected to the CAN 162, for example, for cybersecurity reasons.

The driver inputs may include, for example, an accelerator pedal position (APP) 166 which may be provided to the ECM 106. A cruise control input 168 may also be input to the ECM 106 from a cruise control system. In various implementations, the cruise control system may include an adaptive cruise control system. A brake pedal position (BPP) 170 may be provided to the EBCM 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank. While example inputs are provided, the present application is also applicable to other driver inputs. Additionally or alternatively, the modules may utilize one or more other inputs.

The vehicle system may include an infotainment module 182. The infotainment module 182 controls what is displayed on a display 184. The display 184 may be a touchscreen display in various implementations and transmit signals indicative of user input to the display 184 to the infotainment module 182. The infotainment module 182 may additionally or alternatively receive signals indicative of user input from one or more other user input devices 185, such as one or more switches, buttons, knobs, etc.

The infotainment module 182 may receive signals from a plurality of external sensors and cameras, generally illustrated in FIG. 1 by 186. For example, the infotainment module 182 may display video, various views, and/or alerts on the display 184 via input from the external sensors and cameras 186. The external sensors and cameras 186 sense and capture images of the environment around the vehicle.

The infotainment module 182 may also generate output via one or more other devices. For example, the infotainment module 182 may output sound via one or more speakers 190 of the vehicle. The vehicle may include one or more additional control modules that are not shown, such as a chassis control module, a battery pack control module, etc. The vehicle may omit one or more of the modules shown and discussed.

Input from the external sensors and cameras 186 may also be used to control autonomous driving, determining whether to enter into or disable autonomous driving, and/or for one or more other uses.

A global positioning system (GPS) module 191 receives GPS data from a GPS system. A V2X module 193 communicates with other vehicles via a vehicle to vehicle (V2V) communication protocol and/or with infrastructure via a vehicle to infrastructure (V2I) communication protocol. V2V communication and V2I communication can be more generally referred to as V2X communication.

Figure 2:
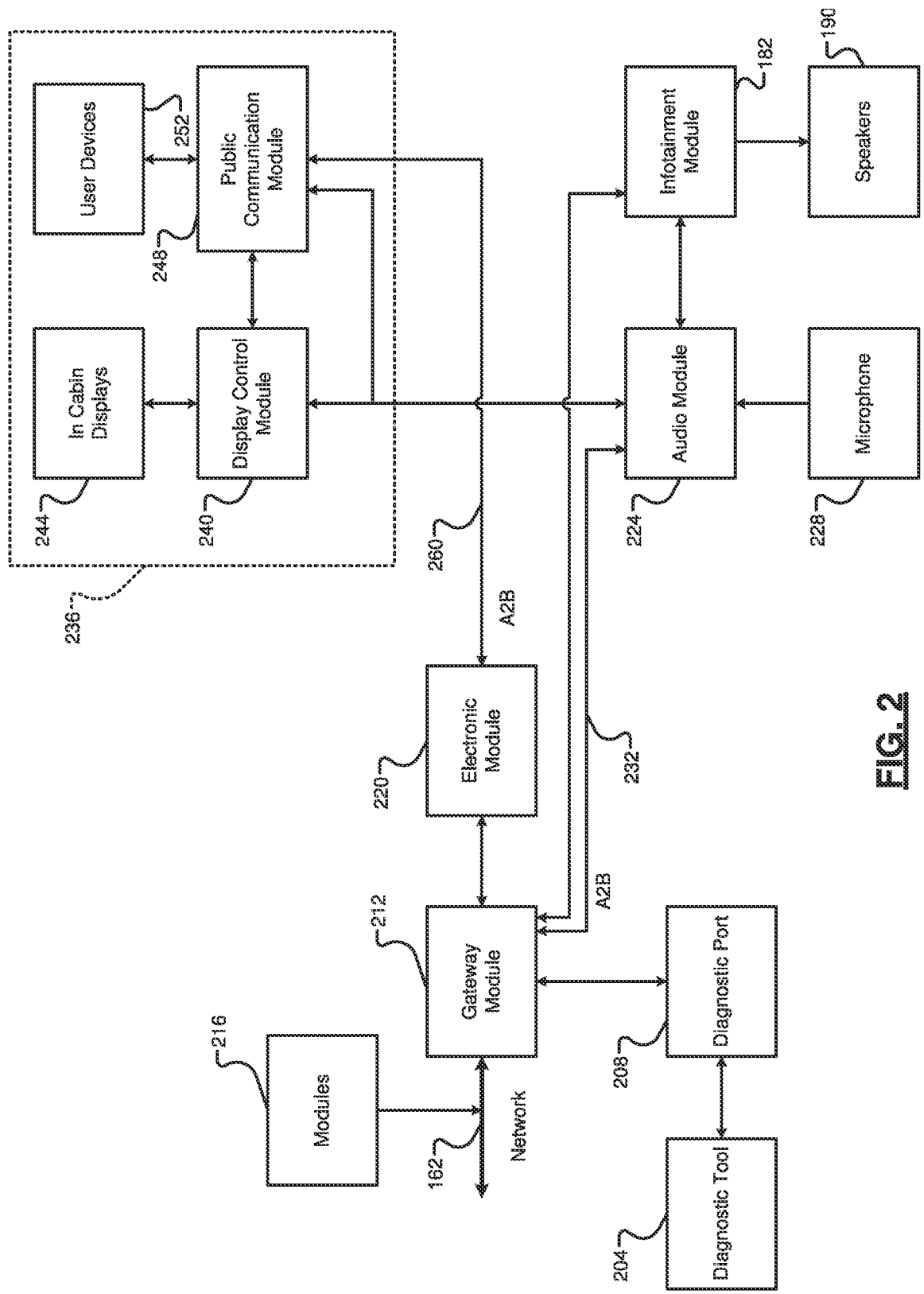
FIG. 2 is a functional block diagram of an example diagnostic system.

Referring now to FIG. 2, a functional block diagram of an example diagnostic system is presented. A diagnostic tool (or device) 204 electrically connects to the vehicle via a diagnostic port 208. The diagnostic port 208 may be referred to as an assembly line diagnostic link (ALDL) port and may satisfy one or more on-board diagnostic (OBD) requirements, such as OBD-II requirements. The diagnostic port 208 may also include an Ethernet port and/or one or more other types of communication ports.

When the diagnostic tool 204 is connected to the diagnostic port 208, the diagnostic tool 204 can request diagnostic data (e.g., diagnostic trouble codes (DTCs)) of the vehicle, present parameters of the vehicle, and other information on the vehicle. A gateway module 212 (a private module implemented on the private side of the network) may receive the requested data from the CAN 162 from modules 216 of the vehicle, such as the modules described with respect to FIG. 1, and transmit the data to the diagnostic tool 204 via the diagnostic port 208. The modules 216 may set DTCs when faults occur and share parameters via the CAN 162.

The vehicle may also include an electronic module 220, such as a telematics and navigation module or another suitable electronic module. The electronic module 220 may include the GPS module 191 discussed above and one or more other modules.

The vehicle may also include an audio module 224 configured to receive audio input received via one or more microphones configured to capture sound within the passenger cabin of the vehicle, such as microphone 228. The audio module 224 is configured to transmit received audio to the gateway module 212 via an automotive audio bus (A2B) 232 using an A2B communication protocol.

A2Bs are high bandwidth digital audio buses. A2B buses can transmit integrated inter-IC sound (I2S) bus information, time division multiplexing (TDM) information, pulse density multiplexing (PDM) information, and inter integrated circuit (I2C) information along with clock and power using a single two-wire unshielded twisted pair (UTP) cable. Other modules, such as the modules 216, the electronic module 220, and the infotainment module 182 may communicate with the gateway 212 via Ethernet connections and/or one or more other types of connections.

The vehicle may also include an unprotected public portion 236 that is partitioned from the CAN 162 and does not communicate with the gateway 212 via any Ethernet connections. For example, a display control module 240 may control what is displayed via one or more in cabin displays 244 that are viewable within the passenger cabin of the vehicle. A public communication module 248 may communicate with one or more user devices 252 (e.g., cellular phones, tablets, computing devices, headphones, etc.) of users of the vehicle, such as via a Bluetooth (BT) (IEEE 802.15 based) standard, a WiFi (IEEE 802.11 based) standard, etc. The public communication module 248 may, for example, enable the user devices to access the Internet via the vehicle instead of, for example, cellular connections of the user devices 252.

Because the unprotected public portion 236 is partitioned from the CAN 162 and does not communicate with the gateway 212 via Ethernet connection, however, diagnostic data may not be available from the unprotected public portion 236. The present application involves an A2B 260 connected between the unprotected public portion 236 of the vehicle system and the gateway module 212. One or more modules of the unprotected public portion 236 (e.g., the public communication module 248) may transmit diagnostic data and other data to the diagnostic tool 204 via the A2B 260.

Figure 3:
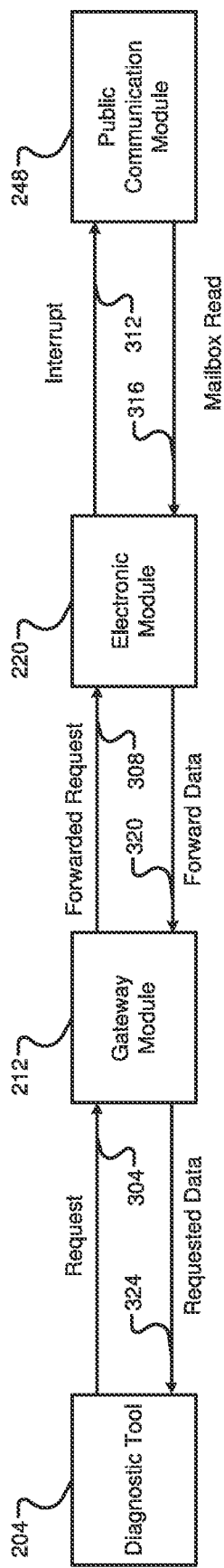
FIG. 3 is a functional block diagram of a portion of the diagnostic system of FIG. 2 performing a diagnostic method.

FIG. 3 is a functional block diagram of a portion of the diagnostic system of FIG. 2 performing a diagnostic method. The diagnostic tool 204 transmits a request 304 to the gateway module 212 via the diagnostic input/output (I/O) port 208. The gateway module 212 retrieves the requested data from modules (not in the unprotected public portion 236) via the CAN 162.

The gateway module 212 also forwards the request 304 to the electronic module 220 at 308. In response to receipt of the request, the electronic module 220 transmits an interrupt 312 to the public communication module 248 to enable a (e.g., status) read from the public communication module 248.

In response to the interrupt 312, the public communication module 248 populates the requested data (e.g., packets) in a mailbox. The public communication module 248 also sets a mailbox status indicator (e.g., bit) to a full state or another state. The mailbox status indictor being in the full state indicates to the electronic module 220 that the requested data can be read from the public communication module 248 by the electronic module 220.

When the mailbox status indicator is set to the full state, the electronic module 220 reads the data from the mailbox at 316 over the A2B 260. Once all of the data in the mailbox has been read, the public communication module 248 empties (deletes) the data from the mailbox. The public communication module 248 also sets the mailbox status indicator to an empty state or another state to indicate an acknowledgement to the electronic module 220. An example illustration of transferring data from a slave module to a master module via an A2B using a mailbox as described herein can be found in the AD2420(W)/6(W)/7(W)/8(W)/9(W) Automotive Audio Bus A2B Transceiver Technical Reference, Revision 1.1, October 2019.

The electronic module 220 forwards the read data (packets) to the gateway module 212 over the CAN 162 or an Ethernet connection at 320. The gateway module 212 converts the forwarded data 320 (e.g., packets of unique identifiers) into a unified diagnostic services (UDS) format and transmits the UDS diagnostic data 324 to the diagnostic tool 204 via the diagnostic port 208. The UDS format is defined in the ISO (International Standardization Organization) 14229 standard.

The electronic module 220 includes an A2B chipset to communicate via the A2B 260. The electronic module 220 is configured as a primary device, and the public communication module 248 is configured as a secondary device. The electronic module 220 and the public communication module 248 have a code image that enables the communication protocol between the network layers such that mailbox messaging is enabled. The electronic module 220 sends interrupts to the public communication module 248 via the A2B mailbox feature. The mailbox may be configurable up to 32 bits upstream and downstream.

The above allows electronic modules that are not included on the CAN 162 and/or an Ethernet network of the vehicle to use an audio transfer protocol (A2B) to relay to communicate diagnostic and other data for transmission to the diagnostic tool 204. The above does not enable bi-directional communication between the electronic module 220 and the public communication module 248. Only the electronic module 220 transmits and receives data to and from the public communication module 248. The public communication module 248 does not transmit signals to the electronic module 220 via the A2B 260.

Examples of data that can be read by the electronic module 220 from the public communication module 248 include, but are not limited to, DTCs, DTC counts, DTC enable/disable indicator states, unique identifiers (e.g., of components, such as modems, applications, processors, etc. and of code, such as software versions, etc.). Examples of unique identifiers include IDs, inter integrated circuit identification numbers (ICCIDs), international mobile equipment identities (IMEIs), mobile subscriber IDSNs (MSIS-DNs), and other unique identifiers of components and/or code. Other examples of data that can be read by the electronic module 220 from the public communication module 248 include, but are not limited to, enable/disable states of components, part numbers, code versions, certificate issuers, certificate subjects, WiFi hotspot name, WiFi hotspot password, fault thresholds, cellular configuration, a vehicle identification number (VIN) of the vehicle, traceability data, and other parameters.

Figure 4:
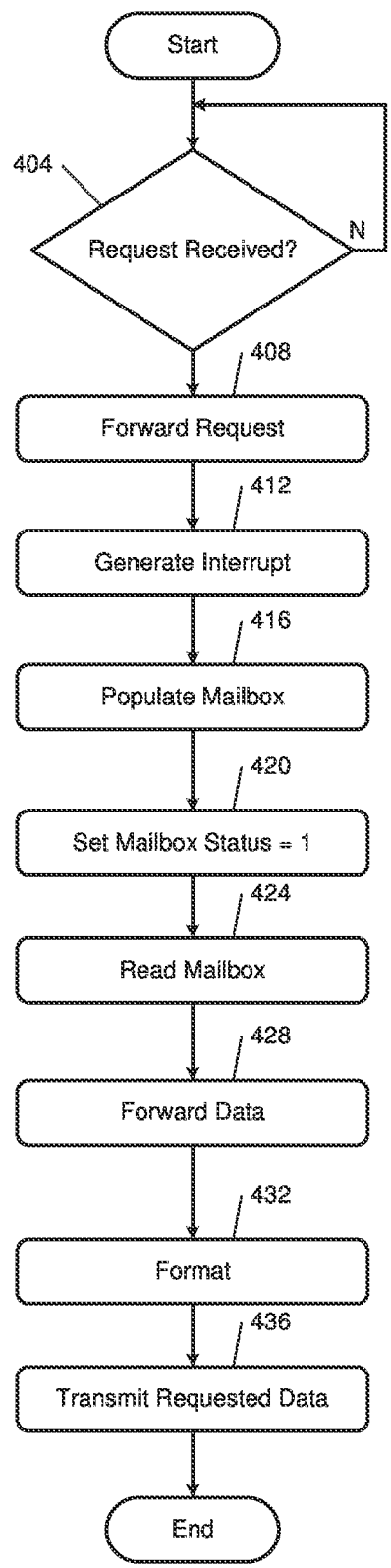
FIG. 4 is a flowchart depicting an example diagnostic method.

FIG. 4 is a flowchart depicting an example diagnostic method. At 404 the gateway module 212 determines whether a request has been received from a diagnostic tool. If 404 is false, control remains at 404. If 404 is true, control continues with 408. The diagnostic tool 204 transmits a request 304 to the gateway module 212 via the diagnostic input/output (I/O) port 208. The gateway module 212 retrieves the requested data from modules (not in the unprotected public portion 236) via the CAN 162.

The gateway module 212 forwards the request 304 to the electronic module 220 at 408. In response to receipt of the request, the electronic module 220 transmits an interrupt 312 to the public communication module 248 to enable a (e.g., status) read from the public communication module 248 at 412.

In response to the interrupt, the public communication module 248 populates the requested data (e.g., packets) in a mailbox at 416. The public communication module 248 also sets a mailbox status indicator (e.g., bit) to a full state or another state at 420 once the mailbox has been populated. The mailbox status indictor being in the full state indicates to the electronic module 220 that the requested data can be read from the public communication module 248 by the electronic module 220.

When the mailbox status indicator is set to the full state, the electronic module 220 reads the data from the mailbox at 424 over the A2B 260. Once all of the data in the mailbox has been read, the public communication module 248 empties (deletes) the data from the mailbox. The public communication module 248 also sets the mailbox status indicator to an empty state or another state to indicate an acknowledgement to the electronic module 220.

The electronic module 220 forwards the read data (packets) to the gateway module 212 over the CAN 162 or an Ethernet connection at 428. The gateway module 212 converts the forwarded data 320 (e.g., packets of unique identifiers) into a unified diagnostic services (UDS) format at 432. The gateway module 212 transmits the UDS diagnostic data 324 to the diagnostic tool 204 via the diagnostic port 208 at 436.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A diagnostic system of a vehicle, comprising:
    a diagnostic port configured to:
        connect to a diagnostic device; and
        receive a request for data from the vehicle from the diagnostic device;
    a private module connected to a controller area network (CAN) bus of the vehicle and to the diagnostic port;
    a public communication module configured to wirelessly connect to computing devices within a passenger cabin of the vehicle,
    wherein the public communication module is partitioned from the CAN bus of the vehicle;
    a second module connected to the private module; and
    an automotive audio bus (A2B) connecting the second module with the public communication module,
    wherein the second module is configured to selectively read data from the public communication module via the A2B in response to the request.

2. The diagnostic system of claim 1 wherein the public communication module does not transmit any messages to the second module over the A2B.

3. The diagnostic system of claim 1 wherein the private module is further configured to transmit the read data to the diagnostic device.

4. The diagnostic system of claim 3 wherein the private module is further configured to convert the read data into a unified diagnostic services (UDS) format and transmit the read data in the UDS format to the diagnostic device.

5. The diagnostic system of claim 1 wherein the second module is connected to the private module via an Ethernet connection.

6. The diagnostic system of claim 1 wherein;
    the second module is configured to transmit an interrupt to the public communication module in response to the request;
    the public communication module is configured to populate a mailbox with the data in response to the interrupt; and the second module is configured to read the data from the mailbox.

7. The diagnostic system of claim 6 wherein:
the public communication module is configured to set a mailbox status indicator to a first state when the mailbox has been populated; and
the second module is configured to read the data in response to the setting of the mailbox status indicator to the first state.

8. The diagnostic system of claim 7 wherein the public communication module is configured to set the mailbox status indicator to a second state after all of the data has been read from the mailbox.

9. The diagnostic system of claim 6 wherein:
the private module is configured to forward the request to the second module; and
the second module is configured to transmit the interrupt in response to receipt of the forwarded request.

10. The diagnostic system of claim 6 wherein:
the second module is configured to forward the read data to the private module; and
the private module is configured to transmit the read data to the diagnostic device.

11. The diagnostic system of claim 1 wherein the private module is further configured to receive data from a third module via the CAN bus and to transmit the received data to the diagnostic device.

12. The diagnostic system of claim 1 wherein the second module only receives the data requested by the diagnostic device from the public communication module via the A2B.

13. A diagnostic method for a vehicle, comprising:
connecting to a diagnostic device via a diagnostic port;
receiving a request for data from the vehicle from the diagnostic device;
by a private module, communicating with a controller area network (CAN) bus of the vehicle and the diagnostic port;
by a public communication module, wirelessly connecting to computing devices within a passenger cabin of the vehicle,
wherein the public communication module is partitioned from the CAN bus of the vehicle;
by a second module, communicating with the private module; and
by the second module, communicating with the public communication module via an automotive audio bus (A2B) including selectively read data from the public communication module, by the second module, via the A2B in response to the request.

14. The diagnostic method of claim 13 wherein the public communication module does not transmit any messages to the second module over the A2B.

15. The diagnostic method of claim 13 further comprising, by the private module, transmit the read data to the diagnostic device.

16. The diagnostic method of claim 15 wherein further comprising:
converting the read data into a unified diagnostic services (UDS) format; and
transmitting the read data in the UDS format to the diagnostic device.

17. The diagnostic method of claim 13 further comprising, by the second module, communicating with the private module via an Ethernet connection.

18. The diagnostic method of claim 13 further comprising:
by the second module, transmitting an interrupt to the public communication module in response to the request;
by the public communication module, populating a mailbox with the data in response to the interrupt; and
by the second module, reading the data from the mailbox.

19. The diagnostic method of claim 18 further comprising:
by the public communication module, setting a mailbox status indicator to a first state when the mailbox has been populated; and
by the second module, reading the data in response to the setting of the mailbox status indicator to the first state.

20. The diagnostic method of claim 19 further comprising, by the public communication module, setting the mailbox status indicator to a second state after all of the data has been read from the mailbox.

\* \* \* \* \*